(12) United States Patent
Colombo

(10) Patent No.: US 7,556,419 B2
(45) Date of Patent: Jul. 7, 2009

(54) MACHINE FOR MIXING AND EXTRUDING RUBBER-BASED AND SILICONE-BASED PLASTIC MATERIALS AND METHOD THEREFOR

(75) Inventor: Ubaldo Colombo, Busto Arsizio (IT)

(73) Assignee: Colmec S.p.A., Busto Arsizio (Varese) (IT)

( * ) Notice: Subject to any disclaimer, the term of this patent is extended or adjusted under 35 U.S.C. 154(b) by 663 days.

(21) Appl. No.: 10/577,422

(22) PCT Filed: Oct. 28, 2003

(86) PCT No.: PCT/IT03/00664

§ 371 (c)(1),
(2), (4) Date: Apr. 27, 2006

(87) PCT Pub. No.: WO2005/039847

PCT Pub. Date: May 6, 2005

(65) Prior Publication Data

US 2007/0159916 A1    Jul. 12, 2007

(51) Int. Cl.
B29B 7/20    (2006.01)
B29C 47/40    (2006.01)
B01F 7/08    (2006.01)

(52) U.S. Cl. .................. 366/77; 366/83; 425/208

(58) Field of Classification Search .............. 366/83, 366/77; 425/204, 207, 208, 209
See application file for complete search history.

(56) References Cited

U.S. PATENT DOCUMENTS

| 2,694,224 | A |   | 11/1954 | Rhodes |
| 3,191,229 | A |   | 6/1965 | Vanzo |
| 3,226,097 | A |   | 12/1965 | Vayda et al. |
| 3,314,660 | A |   | 4/1967 | Arbiter |
| 3,325,864 | A | * | 6/1967 | Kohyama et al. ............. 366/83 |
| 6,129,450 | A |   | 10/2000 | Braun |

FOREIGN PATENT DOCUMENTS

| DE | 100 24 492 A1 | 1/2002 |
| EP | 0 472 431 A2 | 8/1991 |
| EP | 0 574 172 A1 | 12/1993 |
| WO | WO 00/53390 | 9/2000 |

* cited by examiner

Primary Examiner—Tony G Soohoo
(74) Attorney, Agent, or Firm—Young & Thompson

(57) ABSTRACT

A machine for the mixing and extrusion of rubber-based and silicone-based plastic materials and method thereof is disclosed, comprising a dump extruder with conical converging twin screws (10) arranged in a batching chamber (12) in which the outlet of the dump extruder is temporarily closed by a removable blind flange (11), the batching chamber also acting as a compounding chamber.

7 Claims, 3 Drawing Sheets

MACHINE FOR MIXING AND EXTRUDING RUBBER-BASED AND SILICONE-BASED PLASTIC MATERIALS AND METHOD THEREFOR

FIELD OF THE INVENTION

The present invention relates to a machine for the mixing and extrusion of rubber-based and silicone-based plastic materials and the method therefor.

BACKGROUND OF THE INVENTION

It is known that, in modern processes for the preparation of rubber compounds, a system is employed consisting of a closed mixer, commonly called "Banbury mixer", paired with a twin-screw extruder called "Dump Extruder" (FIG. 5). The system provides that the raw material, typically rubber, or a silicone-based polymer, is mixed with fillers and various additives in a closed Banbury-type (from the name of its inventor) mixer, from which, at regular intervals, an evenly-mixed compound comes out, called "batch", which falls into the feedbox of the dump extruder lying below.

In other words, during operation, the closed mixer delivers at regular intervals batches of compounded material to the dump extruder, which has instead the function of transforming the compound batch so prepared—typically coming out in the shape of a continuous strip or leaf; this is subsequently cooled and sent to the following processing steps.

Alternatively to this system, the step of the preparation of the compound to be extruded can be carried out in an open cylinder mixer: however, in order to obtain a good batch, this type of mixer requires an operator to be present at all times handling the material to be compounded by cutting and reintroducing the compound into the mixer where necessary.

The cylinder mixer is a bulky, expensive and non-automatic machine, and exposes the operator to a high level of injury hazard.

The object of the present invention is to overcome these disadvantages by supplying a machine that does not need an open cylinder mixer for the preparation of the rubber compound or silicone-based material.

Such object is achieved by means of a machine as described in its essential features in the attached main claim.

Other inventive aspects of the machine and method thereof are described in the dependent claims.

BRIEF DESCRIPTION OF THE DRAWINGS

Further features and advantages of the machine according to the invention will become apparent from the following detailed description of a preferred embodiment thereof, given by way of example and taken in conjunction with the accompanying drawings, wherein.

DESCRIPTION OF SOME PREFERRED EMBODIMENTS

Figure 1:
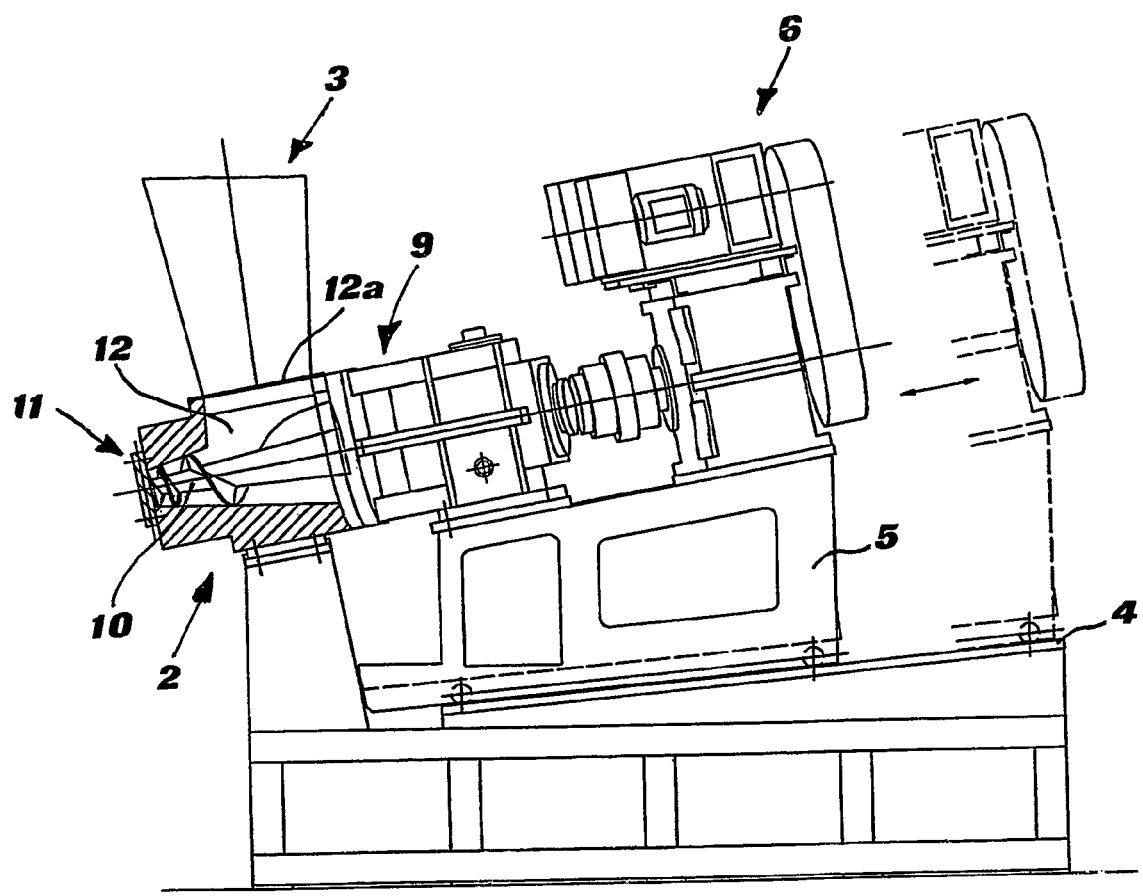
FIG. 1 is an elevation side view, partially cross-sectioned, of a machine according to the invention.
Figure 2:
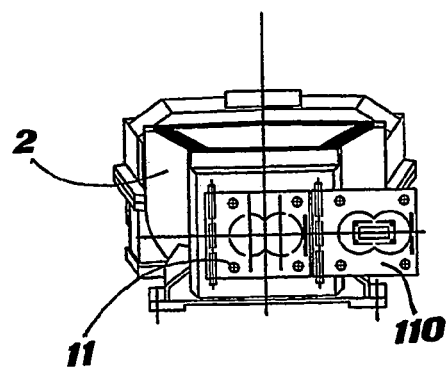
FIG. 2 is a partial elevation front view of the sealing flange of the machine according to the invention.

A mixer according to the invention mainly comprises a cone-shaped twin-screw extruder typically called dump extruder, as shown in FIG. 1, for example the model CTE (Conical Twin Extruder) by Colmec S.p.A.

The mixer comprises a fixed base from whose front end a post rises that supports a twin-screw body 2 provided with a feedbox 3. The upper surface of the fixed base is further provided with rails 4 onto which is capable of translating a sliding support 5 of a motor body 6.

Belonging to the motor body 6 are also a reduction unit 7, a joint 8 and a support box 9 of the extrusion screws, from which depart two conical screws 10 housed in a batching chamber of the twin-screw body 2.

Figure 3:
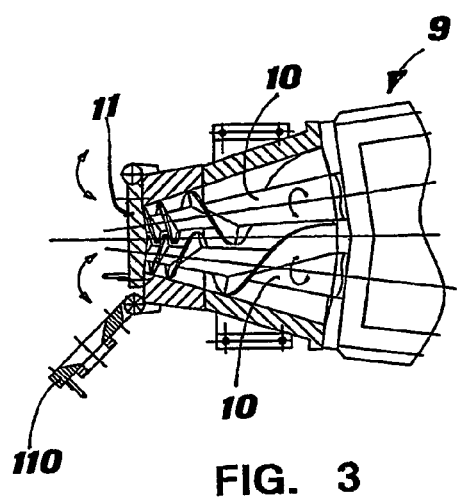
FIG. 3 is a top plan view, partially cross-sectioned, of the front part of the machine according to the invention.

As can be observed in FIG. 3, the two conical screws 10 are intermeshing and converge towards the outlet of the twin-screw body 2. They are driven to rotate by the motor body 6 in counterrotation mode.

Furthermore, the batching chamber 12 opens towards the feedbox 3 through a mouthpiece 12a.

According to the invention, a blind sealing flange 11 is provided on the outlet of the twin-screw body 2. The flange 11 can be easily removed, in order to keep the outlet closed, as long as desired during the mixing step, while it can be removed to allow the extruded material to come out at the end of compounding.

According to a simpler embodiment, the blind flange 11 is simply bolted onto the twin-screw body 2. Alternatively, it is hinged on a side and fixed by a latch on the other side.

Through this design the Applicant was able to configure in a completely unusual and unexpected way a traditional dump extruder so that it operates in a capacity for which it was not designed, i.e. as a mixer. As a matter of fact, with the outlet of the dump extruder closed as described, the material introduced through the feedbox 3 is forced to recirculate around itself inside the chamber 12, resulting in a homogeneous compound.

Figure 4A:
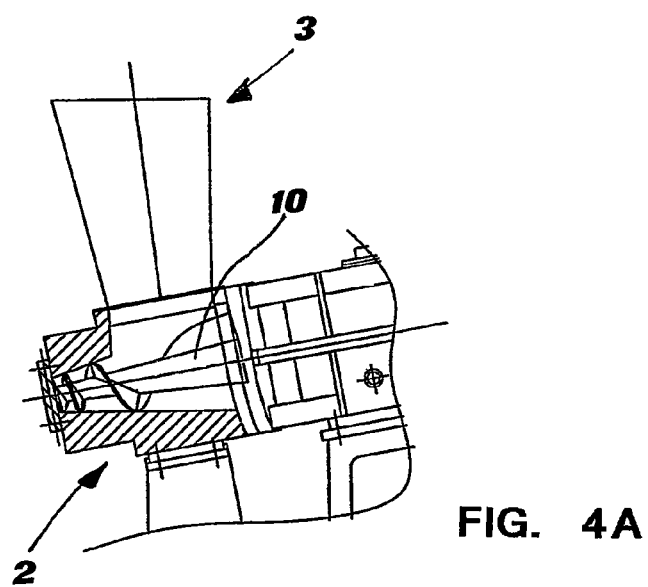
FIG. 4A is an enlarged view of the front part of the machine shown in FIG. 1.

In particular, during operation, with the blind flange 11 in a closed position, the materials to be compounded, such as rubbers, fillers, accelerators, etc., are loaded through the feedbox 3 and fed into the batching chamber 12. Starting of the motor and the resulting opposed rotation of the conical screws 10 pushes the material to be mixed towards the outlet. The blind flange 11, however, does not allow discharge of the batch outside chamber 12, and forces the material to recirculate backwards towards the chamber. An increasing pressure gradient is so obtained between a material feeding area, at low pressure, and a "ducted" area near the blind flange, at high pressure (FIG. 4A). The recirculation of the various basic components between variable pressure areas allows quick and effective mixing of the compound.

To avoid compound stagnation in the front part of the chamber, according to a preferred embodiment of the invention the conical screws 10 are arranged in the twin-screw body 2 so as to graze with their front end the blind flange 11. By doing so, all the material is forced to return to the low-pressure area, avoiding undesired stagnation.

Once the mixing operation is finished, the blind flange 11 is removed and a flange 110 with an open drawing plate is applied. The screws 10 in rotation hence push the compound through the open drawing plate to the next processing step.

The Applicant was able to verify that this unusual dump extruder configuration allows to obtain excellent results in terms of homogeneous batch, distribution and dispersion of the components and of overall process cost-performance.

A sample processing cycle was performed as described in the following.

In the machine according to the invention a silicone-based polymer was introduced through the feedbox; immediately afterwards colourings, accelerators and some fillers were added. The compound was considered ready for the following extrusion after 10 minutes only.

Advantageously, the extruder is designed so that cleaning operations of the twin-screw body 2 and of the conical screws 10 are particularly easy: translation of the sliding support 5 allows the conical screws 10 to be completely removed from the twin-screw body 2, consequently allowing to remove any material residues present in the chamber 12.

As can be easily understood, the present invention brilliantly overcomes in a completely original way the problems outlined in the preamble with reference to the mixing of rubber-based and silicone-based plastic materials.

The process is automatic, allowing to obtain a homogeneous product regardless of the skills of the operator.

Besides, the process can be carried out in a fully enclosed space, better safeguarding the operators' health, who are no longer forced to work in a hazardous environment.

The machine so provided further allows to noticeably decrease the total power input during the mixing and extrusion process.

Figure 4B:
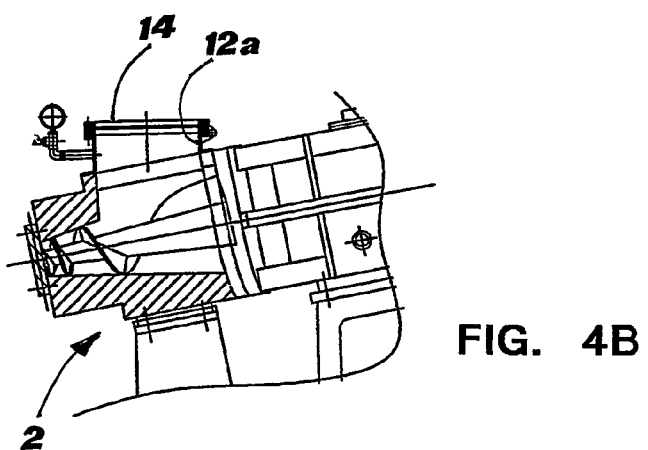
FIG. 4B is an enlarged view similar to FIG. 4A of another embodiment of the invention.
Figure 5:
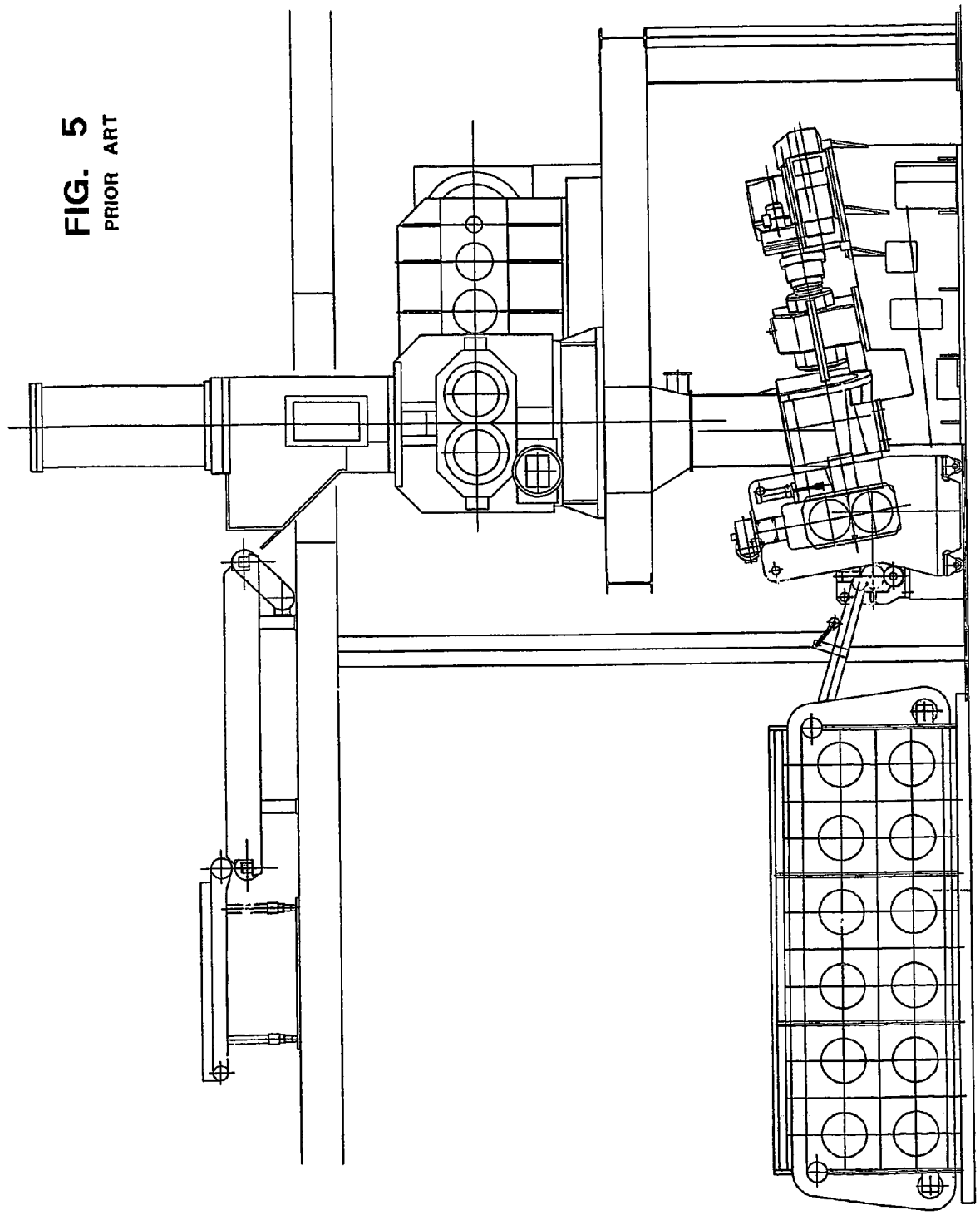
FIG. 5 is an elevation side view of a system according to the prior art.

According to a particularly advantageous embodiment of the invention (FIG. 4B), the whole processing chamber of the twin-screw body is sealed, by means of the blind flange 11 and a cover 14, which has been specifically designed to seal the mouthpiece 12a of the feedbox. In this way it is possible to carry out the mixing under vacuum, thereby preventing the undesired inclusion in the compound of air bubbles, which would otherwise originate defects in the semifinished product appearing from the extruder.

This embodiment exploits particularly well the machine features according to the invention; the plastic material in fact, throughout the whole processing line, from the raw material up to the extrusion thereof, remains in a vacuum condition—since it must not even travel from a separate mixer to the extruder—thereby better guaranteeing homogeneity and the absence of gas inclusions.

It is understood, however, that the invention is not limited to the specific embodiments illustrated above, which represent only non-limiting examples of the scope of the invention, but that a number of changes may be made, all within the reach of a skilled person in the field, without departing from the scope of the invention.

The invention claimed is:

1. A mixing and extrusion machine for rubber-based and silicone-based plastic materials of the type comprising a dump extruder equipped with conical converging twin screws located in a batching chamber, said chamber having a low pressure feeding area and a high pressure ducted area, characterised in that it further comprises a removable blind flange for temporarily sealing the outlet of said batching chamber so that said material is forced to recirculate between said duct area and said feeding area within said batching chamber, said chamber thereby also acting as a compounding chamber.

2. Machine as claimed in claim 1 characterised in that the front end of said conical screws (10) grazes said sealing blind flange (11).

3. Machine as claimed in claim 1, in which said batching chamber is sealable in an airtight manner to carry out the compounding process under vacuum.

4. Machine as claimed in claim 1, in which said conical screws are counterrotating.

5. A compounding and extrusion method of a semifinished rubber-based or silicone-based plastic product, of the type comprising the step of extruding said semifinished product from a dump extruder equipped with two conical converging twin screws, characterised in that it further comprises the following prior steps:

applying onto the outlet of the dump extruder a blind flange that closes the outlet, feeding the raw material to be compounded into the batching chamber of said conical screws, starting the dump extruder to force the material to recirculate between said duct area and said feeding area of the batching chamber, for the time necessary to obtain a compounding of the raw material in said chamber, removing said blind flange and continuing operation of the dump extruder up to extrusion of the compound.

6. Method as claimed in claim 5, characterised in that—after the step of introducing the raw material—the following further steps are carried out:

supplying a sealing cover over the opening where the raw material is introduced, placing said batching chamber under vacuum for the whole mixing time.

7. Method as claimed in claim 5, in which—after removing said blind flange—a flange with an open drawing plate of the desired shape is mounted.

\* \* \* \* \*